United States Patent
Hagerskans (10) Patent No.: US 12,493,290 B2
(45) Date of Patent: Dec. 9, 2025

(54) WIRELESS CONTROL SYSTEM FOR AUTONOMOUS VEHICLES OPERATING IN AN EXTENDED AREA

(71) Applicant: Volvo Truck Corporation, Gothenburg (SE)

(72) Inventor: Jonas Hagerskans, Landvetter (SE)

(73) Assignee: Volvo Truck Corporation, Gothenburg (SE)

( * ) Notice: Subject to any disclaimer, the term of this patent is extended or adjusted under 35 U.S.C. 154(b) by 282 days.

(21) Appl. No.: 17/775,621

(22) PCT Filed: Nov. 15, 2019

(86) PCT No.: PCT/EP2019/081483
§ 371 (c)(1),
(2) Date: May 10, 2022

(87) PCT Pub. No.: WO2021/093967
PCT Pub. Date: May 20, 2021

(65) Prior Publication Data
US 2022/0404827 A1    Dec. 22, 2022

(51) Int. Cl.
*G05D 1/00*    (2024.01)
*H04L 67/00*    (2022.01)
(Continued)

(52) U.S. Cl.
CPC ......... *G05D 1/0027* (2013.01); *G05D 1/0055* (2013.01); *H04L 67/12* (2013.01); *H04L 67/34* (2013.01); *H04W 4/90* (2018.02)

(58) Field of Classification Search
CPC ..... G05D 1/0027; G05D 1/0055; H04W 4/90; G08G 1/096783; H04L 67/12; H04L 67/34
See application file for complete search history.

(56) References Cited

U.S. PATENT DOCUMENTS

| | | | |
|---|---|---|---|
| 3,824,469 | A | 7/1974 | Ristenbatt |
| 5,928,294 | A | 7/1999 | Zelinkovsky |

(Continued)

FOREIGN PATENT DOCUMENTS

| | | |
|---|---|---|
| CN | 103253259 A | 8/2013 |
| CN | 109557909 A | 4/2019 |

(Continued)

OTHER PUBLICATIONS

Nakamura, M. et al., "Communication Equipment Evaluation and Functional Filed Tests for AHS," Proceedings of the Conference on Intelligent Vehicles, Sep. 19-20, 1996, Tokyo, Japan, IEEE, 6 pages.

(Continued)

*Primary Examiner* — Helal A Algahaim
*Assistant Examiner* — Karen Lynelle Furgason
(74) *Attorney, Agent, or Firm* — Withrow & Terranova, PLLC (57) ABSTRACT

A wireless control system comprises a plurality of local stations linked by a communication network. Each local station transmits, in a respective radio coverage area, an enduring status signal. An autonomous vehicle is authorized to move while it receives the status signal. When an emergency stop switch of the local station is activated, the local station interrupts its transmission of the status signal. It also instructs one or more further local stations, to which it is linked by a communication network, to interrupt their transmission of the status signal. In this way, the activation of the local emergency stop switch will have effect throughout the control system and will eventually bring all autonomous vehicles to a halt.

16 Claims, 4 Drawing Sheets

(51) Int. Cl.
*H04L 67/12* (2022.01)
*H04W 4/90* (2018.01)

(56) References Cited

U.S. PATENT DOCUMENTS

| | | | |
|---|---|---|---|
| 6,317,682 | B1 | 11/2001 | Ogura et al. |
| 10,255,582 | B2 | 4/2019 | Shydo, Jr. et al. |
| 10,278,095 | B1 | 4/2019 | Kothari et al. |
| 2006/0037528 | A1* | 2/2006 | Farritor .................. E01F 9/688 116/200 |
| 2007/0005609 | A1 | 1/2007 | Breed |
| 2008/0095163 | A1* | 4/2008 | Chen ...................... H04L 45/16 370/392 |
| 2010/0286845 | A1 | 11/2010 | Rekow et al. |
| 2011/0010006 | A1* | 1/2011 | Tani ...................... B25J 9/1674 901/50 |
| 2014/0210646 | A1 | 7/2014 | Subramanya |
| 2014/0320296 | A1* | 10/2014 | Thurber ................. G08B 21/14 340/632 |
| 2015/0032293 | A1* | 1/2015 | O'Neill ................ G05D 1/0088 701/2 |
| 2018/0110039 | A1* | 4/2018 | MacCready ........ H04W 84/005 |
| 2018/0159693 | A1* | 6/2018 | Condeixa ............ H04L 63/0823 |
| 2019/0146511 | A1* | 5/2019 | Hurd .................... G06V 10/143 701/27 |
| 2019/0176323 | A1 | 6/2019 | Coady et al. |
| 2019/0208492 | A1* | 7/2019 | Maruta ................ H04W 64/00 |
| 2019/0239116 | A1* | 8/2019 | Kothari ................ G06Q 10/08 |
| 2022/0308589 | A1* | 9/2022 | Ishii .................... G05D 1/0289 |

FOREIGN PATENT DOCUMENTS

| | | |
|---|---|---|
| JP | 2001318719 A | 11/2001 |
| JP | 2003044138 A | 2/2003 |

OTHER PUBLICATIONS

International Search Report and Written Opinion for International Patent Application No. PCT/EP2019/081483, mailed Jul. 29, 2020, 15 pages.

First Office Action for Chinese Patent Application No. 201980102148.7, mailed Sep. 28, 2024, 22 pages.

* cited by examiner

WIRELESS CONTROL SYSTEM FOR AUTONOMOUS VEHICLES OPERATING IN AN EXTENDED AREA

This application is a 35 USC 371 national phase filing of International Application No. PCT/EP2019/081483, filed Nov. 15, 2019, the disclosure of which is incorporated herein by reference in its entirety.

TECHNICAL FIELD

The present disclosure relates to the field of wireless control systems for autonomous vehicles. In particular, it provides an emergency stop mechanism with effect beyond the coverage area of a single transmitter.

BACKGROUND

While autonomous vehicles (AVs) are designed to operate with little or no human interaction, accepted safety standards require not only monitoring but also the availability of a highly reliable emergency stop mechanism. During operation of AVs, such emergency stop may be ordered automatically, e.g. based on sensor signals, or by a human operator. The safety standards are particularly strict for heavy AVs, autonomous construction equipment and similar machinery.

The failure-prone nature of radio communication must be considered when wireless AV control systems are designed. Indeed, an emergency stop mechanism would be inherently unsafe if it assumed that the transmitter always possessed a working radio link to the moving AV, over which it could transmit an emergency stop message when needed. The risk of radio link failure can be neutralized if, instead, the wireless AV control system orders an emergency stop by no longer sending an authorization signal. From the AVs point of view, movement is allowed only when the vehicle receives the authorization signal as expected, e.g., at specified intervals. If the AV loses the radio link to the transmitter, it must halt.

The emergency stop mechanism in a wireless AV control system under this 'authorization signal' paradigm can normally be designed with satisfactory safety characteristics. It would be desirable to provide an AV control system with an equivalent emergency stop mechanism for use cases where the AVs operate on a work site that cannot be covered by a single radio transmitter. Multiple radio transmitters are needed when the work site has large physical extent, reflective or absorbing surfaces are present, or interference with other transmitters must be managed.

SUMMARY

It is an object of the present invention to propose an emergency stop mechanism for AVs operating beyond a single radio coverage area. The invention is defined by the independent claims.

A first aspect of the invention provides a wireless control system for controlling AVs, comprising a plurality of local stations and a communication network linking the local stations. The local stations correspond to distinct but not necessarily disjoint radio coverage areas.

A second aspect provides the local station for the wireless control system. The local station may comprise a radio transmitter and an emergency stop switch. The radio transmitter is operable to transmit an enduring status signal which authorizes an AV to move while it receives the signal. The transmission of the status signal can be interrupted using the emergency stop switch. According to the second aspect, the local station further comprises a communication element for communicating with one or more further local stations, to which the local station is linked by a communication network and which are similarly equipped. The communication element is configured to instruct at least one of the further local stations to interrupt their transmission of the status signal. Conversely, the communication element is configured such that if it receives, from one of the further local stations, an instruction to interrupt the status signal, it will execute the instruction.

As used herein two local stations are "similarly equipped" if they have the structural and functional properties according to the second aspect. This defines a minimum degree of similarity. The local stations need not be identically implemented, and either of the local stations may include additional structure or functionalities.

A wireless control system comprising local stations according to the second aspect is inherently safe to failure of the radio link towards each AV. An emergency stop triggered by the emergency stop switch in one local station is propagated to the further local stations over the communication network, that is, without relying on said radio links towards the AVs. The propagation will interrupt transmission of the status signal from all local stations in the control system, so that all AVs are ordered to a halt.

A third aspect relates to a method implemented by a local station in a wireless AV control system. According to the method, an activation of the emergency stop switch causes the local station not only to interrupt its status signal but also to instruct one or more local stations in the wireless control system to interrupt theirs.

A local station configured with logic in accordance with the third aspect may act as an element of a wireless AV control system with an inherently safe global emergency stop functionality.

A fourth aspect provides a computer program for executing said method.

Further advantageous embodiments are defined by the dependent claims and will be described in detail below.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described by way of example, with reference to the accompanying drawings, on which.

DETAILED DESCRIPTION

The aspects of the present disclosure will now be described more fully hereinafter with reference to the accompanying drawings, in which certain embodiments of the invention are shown.

These aspects may, however, be embodied in many different forms and the described embodiment are not to be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
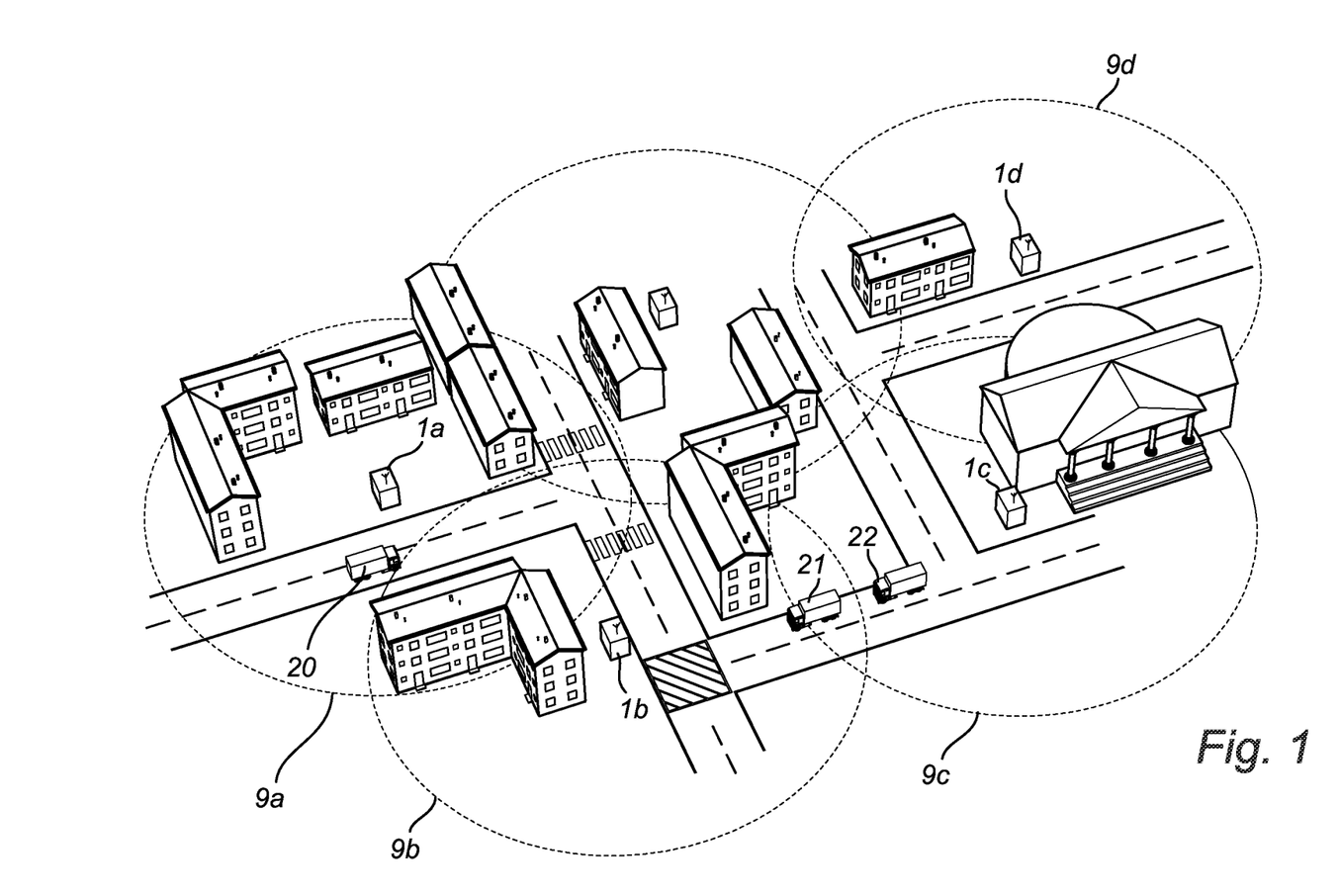
FIG. 1 shows an example work site where an AV control system with multiple local stations has been deployed.
Figure 4:
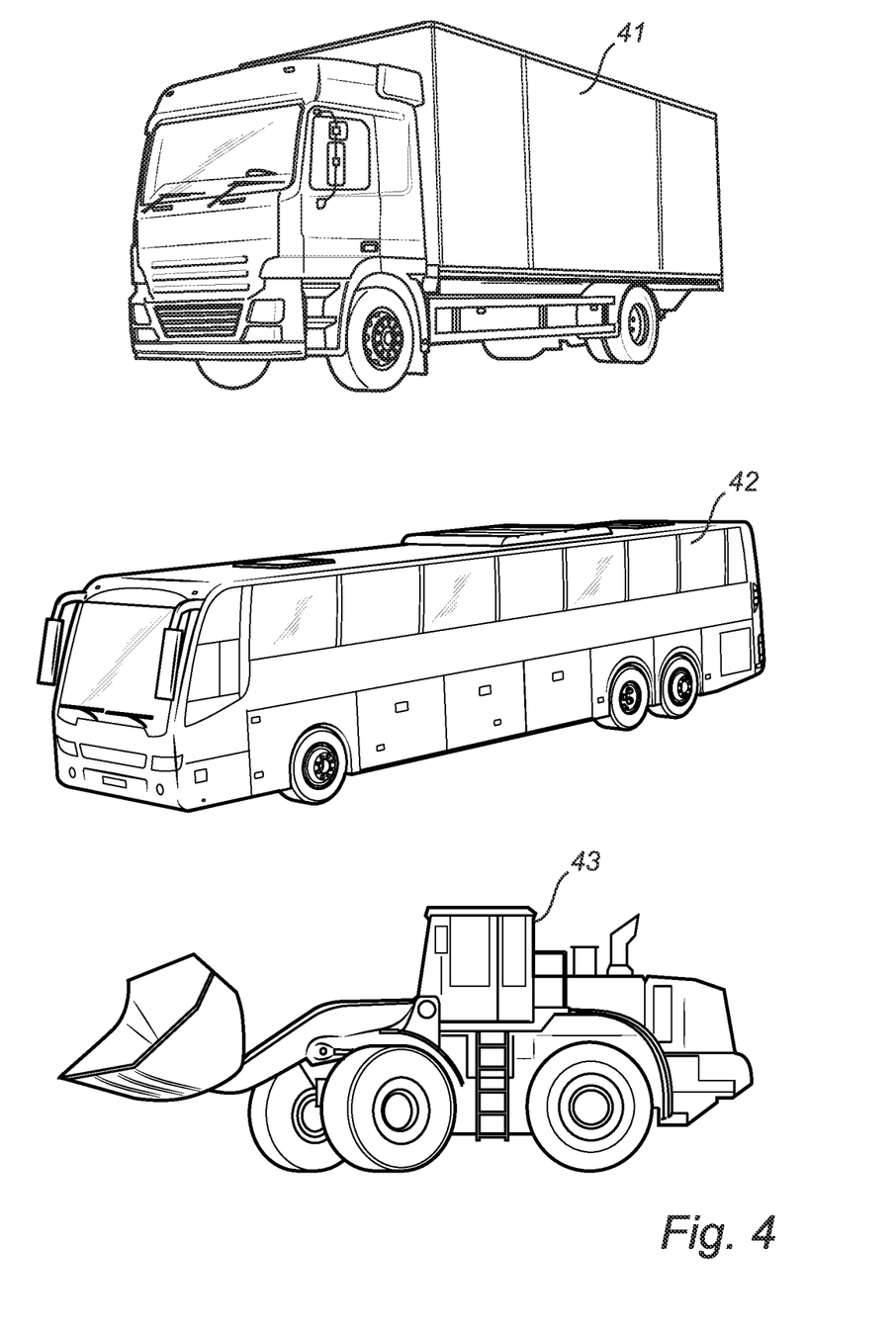
FIG. 4 illustrates example AVs.

FIG. 1 schematically depicts a portion of a work site in which a plurality of AVs 20, 21, 22 operate under the supervision of a wireless control system 10. The AVs may be automobiles, in particular trucks 41, buses 42, light or heavy machinery 43, as shown in FIG. 4. The streets of the work site have an intricate geometry and are lined with buildings and other object that are impenetrable to radio waves. To achieve workable radio conditions in all areas of the work site, multiple local stations 1a, 1b, 1c, 1d have been deployed, each defining a respective radio coverage area 9a, 9b, 9c, 9d. It is noted that the dashed circles in FIG. 1 indicate the maximum extent of each radio coverage area 9a, 9b, 9c, 9d, as if no blocking objects were present. The local stations 1a, 1b, 1c, 1d are linked by a communication network, shown as item 11 in subsequent figures.

The communication network 11 be a wired (including fibre-optical) network or a wireless network. Depending on the spacing of the local stations, wireless implementations of the communication network 11 may operate at local-area or cellular frequencies, or may be an overlay to an existing cellular network according to the GSM, UMTS, LTE or NR standard, or higher. The communication network 11 should preferably be more reliable than the radio link between the local stations 1 and each AV 20, 21, 22; this requirement normally makes wired implementations the preferred choice. However, even a wireless communication network 11 with the local stations as nodes can be made very reliable, considering that stable radio conditions exist between physically stationary nodes, that the local radio stations may transmit at high power unless they are battery-powered and may have enough processing resources to apply sophisticated decoding, multi-antenna techniques and the like.

During normal operation, each local station 1 transmits an enduring radio status signal authorizing the AVs 20, 21, 22 to move. As used herein, movement includes not only driving but also operation of a tipper, arm or other potentially hazardous tools. The radio status signal may be transmitted in accordance with a predefined time-frequency pattern, which may be proprietary or standardized. For example, the status signal may be a reference signal transmitted periodically in a predefined frequency band. To avoid inter-station interference where radio coverage areas overlap, different frequency bands may be assigned to different local stations, wherein the AVs 20, 21, 22 are authorized to move as soon as they receive a status signal from any of the local stations 1. Applying this authorization rule, the emergency stop mechanism according to the invention can be implemented without a need for dedicated handover procedures, like in many known cellular communication systems, when an AV 20, 21, 22 moves into a different radio coverage area 9. The period $T_s$ of the status signal is of the same order of magnitude as the largest acceptable emergency stop latency: if each of the AVs is configured to stop moving if it has failed to receive a predefined number n of transmissions of the status signal, then a first AV 20 which is presently authorized to move by the status signal transmitted by the first local station to will have stopped at most $nT_s$ seconds after the first local station to interrupts the status signal.

It is noted that an AV 20, 21, 22 that moves out of coverage will be automatically halted. Accordingly, the union of all radio coverage areas 9a, 9b, 9c, 9d of the system 10 defines the extent of the work site where the AVs are authorized to move.

Example inner workings of a local station 1 will now be described with reference to FIG. 2, where two similarly equipped local stations 1 are shown connected to a communication network 11. In the illustrated example, the communication network 11 linking the local stations 1 is a wired network and, at least in the portion shown in FIG. 2, has a linear bus topology. A linear bus topology generally allows each node to communicate directly with any other node in the network. The local station 1 comprises a processor 7 and a radio transmitter 2. The processor 7 may be a programmable logic controller (PLC) or be included in a PLC. The radio transmitter 2 is adapted to transmit at least the status signal towards the AVs 20, 21, 22. To this end, the radio transmitter 2 may comprise baseband circuitry, amplifiers and at least one antenna. The radio transmitter 2 may additionally have receiving capabilities.

The local station 1 further comprises an emergency stop switch 3, by which the transmission of the status signal can be interrupted, so that the AVs 20, 21, 22 are brought to a halt. The emergency stop switch 3 can be activated by a human operator, e.g., using an emergency stop key 5 arranged at the local station. Alternatively or additionally, the emergency stop switch 3 can be activated by a signal from a sensor 6. The sensor 6 may for example sense a condition which is relevant to the safety of AVs in the vicinity of the local station 1 or of AVs controlled by the system 10 as a whole, such as high or low temperature, strong wind, presence of unauthorized persons or animals in the work site. The sensor 6 may be arranged within the radio coverage area of the local station 1 or otherwise in a location such that the local station is the most convenient 1 connection point.

The local station 1 optionally comprises a visual indication 8 which is operable to visualize that the emergency stop switch 3 of the local station 1 has been activated. Advantageously, the visual indication 8 is not activated if the local station 1 has interrupted transmission of the status signal in response to an instruction received over the communication network 11 from a different local station. This helps an operator to locate the cause of an emergency stop to a definite local station 1. In one embodiment, the visual indication 8 may be operable in multiple modes. For example, the visual indication 8 may be operable to produce green light representing normal operation, red light representing status signal interrupted by own emergency stop switch, and amber light representing status signal interrupted by an incoming instruction to interrupt received from another local station.

The local station 1 is equipped with a communication element 4 configured to communicate with the further local stations to which it is linked by the communication network 11. The local station 1 shall instruct at least one of the further local stations to interrupt the status signal when the local station's 1 own emergency stop switch 3 is activated. When the communication network 11 has a suitable topology, such as the bus topology illustrated in FIG. 2 or a star topology or similar, the local station 1 can send this instruction autonomously to all further local stations. For daisy-chain and other topologies, as will be explained below, the local station 1 can send the instruction to interrupt to an adjacent local station but may need the assistance of the adjacent and further local stations in order for the instruction to reach all local stations of the system 10, wherein the adjacent local station propagates the instruction to the local station(s) adjacent to itself.

In a condition where the local station 1 receives an incoming instruction to interrupt the status signal, it is configured to execute this instruction. In a star or bus topology, the incoming instruction has originated from another local station, whose emergency stop switch 3 has been activated. In a daisy-chain topology, the incoming instruction to interrupt may have originated either from the local station where the emergency stop switch has been activated or from a local station that has propagated such an instruction from yet another local station. As already mentioned, the visual indication 8 should not be activated if the status signal is interrupted in response to an incoming instruction.

The local station 1 may be configured to transmit signals over the communication network 11 that represent absence or presence of the instruction to interrupt transmission of the status signal. If the communication network 11 includes a separate entity for monitoring the network health and/or has a mechanism for automatically requesting retransmission of failed transmissions, then the instruction can be encoded and signalled in any suitable format. Indeed, a condition where the monitoring or retransmission mechanism indicates disturbances, with a possible effect that the instructions may not be reaching the other local stations as expected, may trigger safety measures in the control system 10, such as a global emergency stop. In implementations where the communication network 11 does not include such safety monitoring or retransmission mechanism—or where, for other reasons, a safety layer is desired in addition to the network's 11 own—the following signalling may be used: (1) an absence of an instruction to interrupt transmission of the status signal corresponds to the local station 1 emitting a heartbeat signal on the communication network 11 and (2) a presence of an instruction to interrupt corresponds to the local station 1 interrupting emission of the heartbeat signal. A heartbeat signal may be any suitable waveform that is unlikely to be confused with a background signal of the communication network 11, such as a standby potential on a transmission line or interference on a radio channel. A square wave with predefined period and pulse width may be used as a heartbeat signal in a wired network.

Normal operation may be resumed by ordering the local stations 1 to start emitting the heartbeat signals again. To avoid self blocking in a condition where a somewhat delayed start of some local station is interpreted as a new instruction to interrupt, the local stations 1 should preferably restart in an approximately simultaneous manner. Alternatively, a dedicated resume procedure order may be defined, which includes a sunrise period during which a local station 1 is allowed to emit the heartbeat signal without receiving the expected heartbeat signals from the linked local stations.

Figure 2:
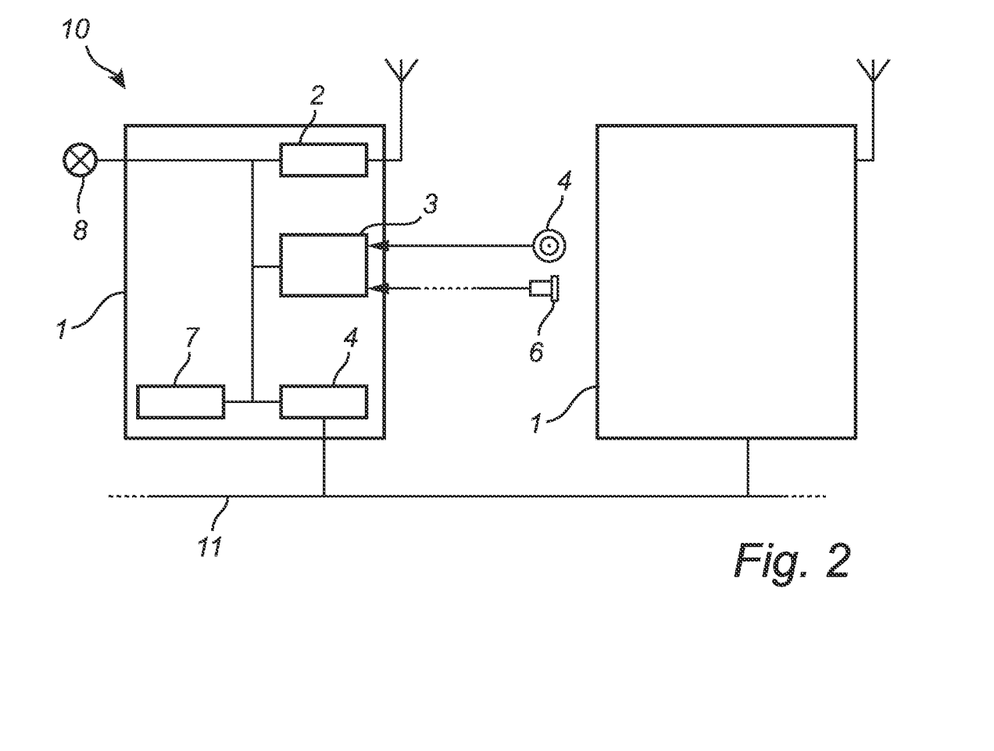
FIG. 2 shows two local stations linked by a communication network with a linear bus topology.

In communication networks 11 with bus or star topologies, such as the one shown in FIG. 2, a transmission by a local station 1 will be received like a multicast message by all other local stations. A time-division protocol may be used to separate and distinguish transmissions originating from different local stations. For example, in a control system 10 with N local stations, each local station may be assigned to emit its heartbeat signal every $N^{th}$ time slot, wherein a unique offset (expressed in number of time slots) is assigned to each local station. Since each local station shall execute an instruction to interrupt regardless of the originator, the local station need not be aware of the exact assignment, only of the set of time slots in which it shall listen for the heartbeat signal. A listening local station will interpret the absence of an expected heartbeat signal in one of the time slots as an instruction to interrupt transmission of the status signal. Instead of time division, a code-division scheme may be adopted, in which different local stations emit orthogonal heartbeat signals.

Figure 3:
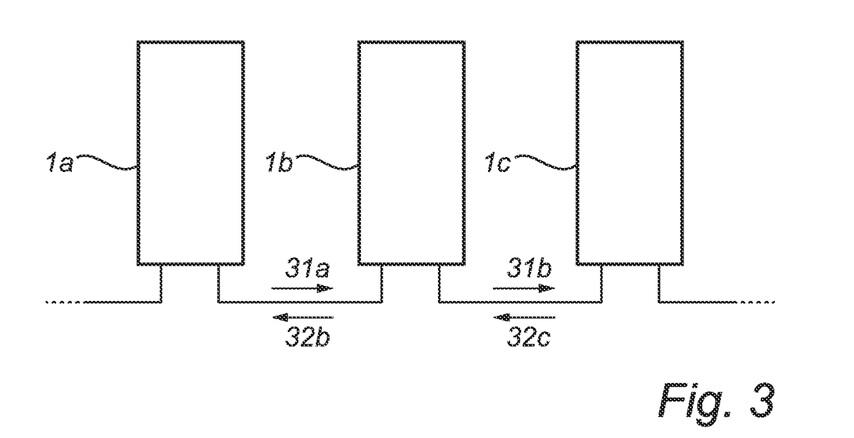
FIG. 3 shows three local stations linked by a communication network with a daisy-chain topology and messages exchanged between these.

With reference now to FIG. 3, corresponding signalling will be discussed for a communication network 11 that has a daisy-chain topology or an equivalent topology in the sense that it allows a local station 1 to send messages only to its one or more adjacent local stations. The communication network 11 is composed of segments, each of which links a pair of local stations. FIG. 3 shows complete segments between the first and second local stations 1*a*, 1*b* and between the second and third local stations 1*b*, 1*c*. Suggested is also a segment between the first local station 1*a* and a further local station (not shown), as well as a segment between the third local station 1*c* and a yet further local station (not shown). The segments may be galvanically isolated from one another to avoid spurious signals caused by leakage, ground differences, short circuits and the like.

It is assumed initially that the segments of the communication network 11 allow unidirectional communication only and that the endpoints of the network 11 are connected to form a closed, cyclic topology. Under this assumption, messages indicated by 32*b* and 32*c* in FIG. 3 are not sent but will be discussed below. In normal operation, the first local station 1*a* emits a first heartbeat signal 31*a* towards the second local station 1*b*, and the second local station 1*b* emits a second heartbeat signal 31*b* towards the third local station 1*c*. Conversely, the second local station 1*b* listens for the first heartbeat signal 31*a*, and the third local station 1*c* listens for the second heartbeat signal 31*b*. If the second local station 1*b* has not received the first heartbeat signal 31*a* for a predetermined time h, it interprets this as an instruction to interrupt received from the first local station 1*a*, and it interrupts the transmission of the status signal in its radio coverage area 9*b*. The second local station 1*b* further stops emitting the second heartbeat signal 31*b* towards the third local station 1*c*; the stopping of the second heartbeat signal 31*b* amounts to propagating the instruction to interrupt. In a AV control system 10 with N local stations, all local stations will be instructed to interrupt their transmission of the status signal within a total propagation time of at most (N−1)h seconds (disregarding internal processing delays), and the last AV to stop will do so after a maximum total latency of $(N-1)h+nT_s$ seconds from activation of the first emergency stop switch.

The propagation time in a communication network 11 with cyclic topology may be reduced if bidirectional communication is possible on each segment, as may be arranged by known multiplexing techniques, such as time-division duplex. Assuming this is possible in the communication network 11 that is partially shown in FIG. 3, each local station emits heartbeat signals 31, 32 towards two adjacent local stations, which as a pure naming convention in this disclosure will be referred to as upward and downward. For example, the second local station 1*b* emits an upward second heartbeat signal 31*b* towards the third local station 1*c* and a downward second heartbeat signal 32*b* towards the first local station 1*a*. Similarly, the second local station 1*b* listens for an upward first heartbeat signal 31*a* from the first local station 1a and for a downward third heartbeat signal from the third local station 1c. In a cyclic topology, this may reduce the maximum total latency to [N/2]h+nT$_s$, where [•] denotes rounding down to the next integer.

If the topology of the communication network 11 in FIG. 3 is open, e.g., the local stations are arranged sequentially between two local stations that constitute endpoints of the network, bidirectional connectivity ensures that eventually, all local stations are reached by an instruction to interrupt transmission of the status signal. In a worst case scenario, where the instruction to interrupt originates from one of the endpoints, the propagation time to the other endpoint is of the order of (N−1)h, and the maximum total latency may be (N−1)h+nT$_s$.

In an embodiment, a local station 1 is configured to sense the presence of its neighbours. In the example just discussed, where the communication network 11 has an open daisy-chain topology with bidirectional network segments, the local stations constituting the endpoints have a different behaviour that the intermediate local stations. A local station 1 configured according to the present embodiment will act as a self-organizing network element. This simplifies the deployment process, since all local stations 1 may be manufactured to have identical hardware and software, wherein individualization is effected in the sensing step.

The sensing of neighbour nodes may be based (a) on an occupied status of cable terminals on the communication element 4, (b) on listening for incoming heartbeat signals in a specific initialization mode where all local stations are set to emit their heartbeat signal(s) regardless of an emergency stop status, or (c) on statistical methods, e.g., by assuming that the maximum number of received heartbeat signals represents the actual connectivity of the local station, by assuming that the connectivity condition prevailing for the longest time represents normal operation. In the example illustrated in FIG. 3, the first, second and third local stations 1a, 1b, 1c will sense the presence of two linked neighbours and will therefore emit and listen for two heartbeat signals each. The endpoint nodes (not shown), after sensing, will only listen for one heartbeat signal and will only emit one. This is to say, the result of the presence sensing determines those further local stations to which the sensing local station is to direct its instruction to interrupt and to which it is to propagate an incoming instruction to interrupt. The embodiment described here may be even more advantageous in communication networks 11 with complex or non-uniform topologies, e.g., where each local station may have one, two, three or more neighbours.

Figure 5:
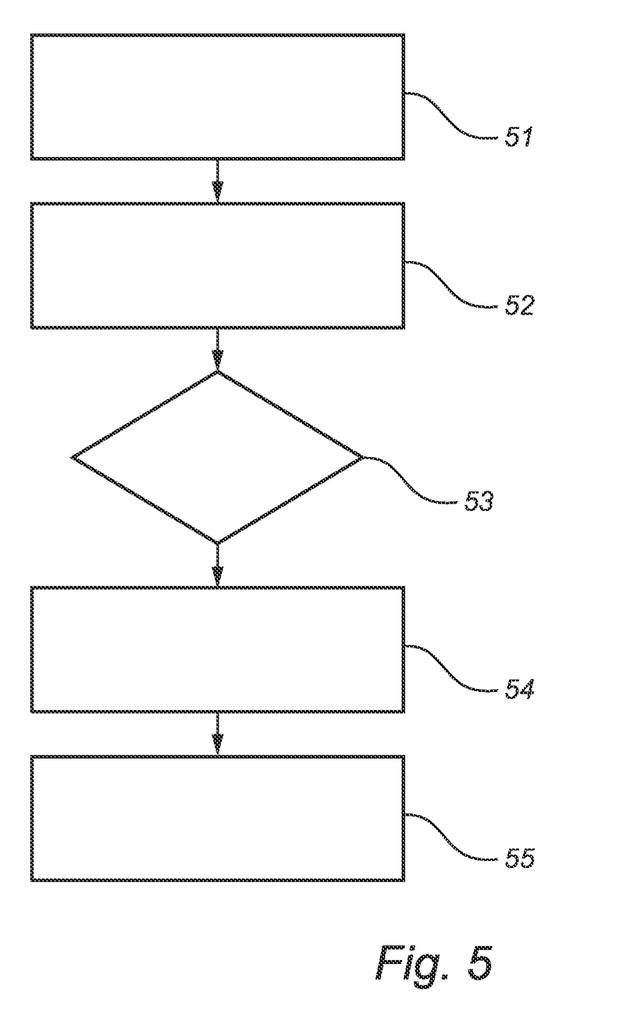
FIG. 5 is a flowchart of a method implemented in a local station.

The above-described behaviour of a local station 1 of a wireless control system to for controlling AVs 20, 21, 22 can be summarized by the method 50 according to the flowchart in FIG. 5. In an optional first step 51, the local station 1 senses presence of at least one adjacent local station, to which it shall direct an instruction to interrupt the status signal and to which it shall propagate an incoming instruction to this effect. In a second step 52, the local station 1 transmits, in a radio coverage area 9 of the local station, an enduring status signal authorizing an AV to move while it receives the signal. In a third step 53, the local station 1 monitors its emergency stop switch 3. If an activation is determined, in a fourth step 54, the local station interrupts transmission of the status signal. In a fifth step 55, further in response to the positive determination in step 53, the local station 1 instructs one or more similarly equipped further local stations in the wireless control system 10 to interrupt their transmission of the status signal.

In specific embodiments, the method 50 may comprise one or more of the additional steps: (i) executing a received instruction to interrupt the status signal by controlling the radio transmitter 2 of the local station 1; (ii) propagating a received instruction to interrupt the status signal, to at least one further local station; (iii) sensing a presence of a further local station to which the local station 1 is linked by a communication network 11, over which an outgoing instruction to interrupt is sent and/or an incoming instruction is propagated; (iv) identifying an adjacent local station, to which said instruction shall be sent or propagated.

Knowing an identity of the adjacent local station, as per step (iv) above, is relevant in a communication network 11 under a protocol allowing only unicast messages including, for example, an address header. Associating the local stations 1 with distinguishable identities may also enable partitioning of the AV control system 10, whereby an emergency stop affects one or more local stations that are adjacent or close to the originator local station but is limited to a predefined partition of the system 10. The partition may correspond to a predefined address range of the local station identities. For instance, an administrator of the system 10 may consider that local factors susceptible of triggering an emergency stop are safety-relevant within the partition but not outside; this may enable convenient centralized operation of a geographically extended control system 10 while reducing costly downtime.

The method 50 according to its various embodiments may be performed with the assistance of a processor 7 configured to control a local station 1, wherein the method 50 is represented as computer-readable instructions. In one embodiment, a computer-readable medium comprises such computer-readable instructions. A computer-readable medium in the sense of the appended claims may be any volatile or non-volatile storage medium, or a transitory medium such as a modulated electric, electromagnetic or optical carrier wave transferring said computer-readable instructions. A modulated carrier wave may be used to upload the computer-readable instructions to a memory of a local station that is to perform the method 50.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A local station configured to control a preconfigured set of autonomous vehicles, the local station comprising:
  a radio transmitter operable to transmit, in a radio coverage area of the local station, an enduring status signal authorizing any autonomous vehicle in the preconfigured set of autonomous vehicles present in the radio coverage area to move while the autonomous vehicle receives the signal;
  an emergency stop switch for interrupting the status signal; and
  a communication circuit for communicating through a communication network with one or more similarly equipped further local stations, and configured to:
    instruct, in response to an activation of the local station's emergency stop switch, at least one of the one or more further local stations to interrupt a further status signal;
    execute an instruction received from one of the one or more further local stations to interrupt the status signal; and listen for the further status signal of the one or more similarly equipped further local stations and interpret an absence thereof as an instruction to interrupt the status signal of the local station.

2. The local station of claim 1, wherein the communication network is a wired network.

3. The local station of claim 1, wherein the emergency stop switch is activatable by a human operator.

4. The local station of claim 3, wherein the emergency stop switch comprises an emergency stop key arranged at the local station.

5. The local station of claim 1, wherein the emergency stop switch is activatable by a signal from a sensor arranged within the radio coverage area of the local station.

6. The local station of claim 1, wherein the communication circuit is configured to propagate the received instruction to another one of the further local stations.

7. The local station of claim 1, wherein the communication circuit is configured to:
sense a presence of a further local station to which it is linked by the communication network; and
perform the instructing and any propagating in accordance with the sensed presence.

8. The local station of claim 7, wherein the sensing comprises identifying at least one adjacent local station, to which the instructing and propagating are to be directed.

9. The local station of claim 1, wherein the communication circuit is configured to emit a heartbeat signal via the communication network and to perform the instructing and any propagating by interrupting the heartbeat signal.

10. The local station of claim 1, configured to display a visual indication that the emergency stop switch has been activated.

11. A wireless control system for controlling autonomous vehicles, the system comprising:
a plurality of the local stations of claim 1; and
the communication network.

12. A method implemented by a local station of a wireless control system for controlling a preconfigured set of autonomous vehicles, the method comprising:
transmitting, in a radio coverage area of the local station, an enduring status signal authorizing any autonomous vehicle in the preconfigured set of autonomous vehicles present in the radio coverage area to move while the autonomous vehicle receives the signal;
in response to activation of an emergency stop switch of the local station, interrupting the status signal;
in response to the activation, instructing one or more similarly equipped further local stations in the wireless control system to interrupt a further status signal;
executing an instruction received from one of the one or more further local stations to interrupt the status signal of the local station; and
listening for the further status signal of the one or more similarly equipped further local stations, and interpreting an absence of the status signal of the one or more further local stations as an instruction to interrupt the status signal of the local station.

13. The method of claim 12, further comprising propagating the received instruction to another one of the further local stations.

14. The method of claim 12, further comprising:
sensing a presence of a further local station to which the local station is linked by a communication network; and
performing the instructing and any propagating in accordance with the sensed presence.

15. The method of claim 14, wherein the sensing comprises identifying at least one adjacent local station, to which the instructing and any propagating is to be directed.

16. A non-transitory computer-readable medium comprising instructions which, when executed by a processor controlling a local station of a wireless control system for controlling autonomous vehicles, cause the local station to carry out the method of claim 12.

* * * * *